United States Patent
Scott et al.

(10) Patent No.: US 10,634,002 B2
(45) Date of Patent: Apr. 28, 2020

(54) SOFT WALL CONTAINMENT SYSTEM FOR GAS TURBINE ENGINE

(71) Applicant: ROLLS-ROYCE CORPORATION, Indianapolis, IN (US)

(72) Inventors: Matthew A. Scott, Carmel, IN (US); Matthew J. Kappes, Greenwood, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 358 days.

(21) Appl. No.: 15/581,631

(22) Filed: Apr. 28, 2017

(65) Prior Publication Data

US 2018/0266271 A1    Sep. 20, 2018

Related U.S. Application Data

(60) Provisional application No. 62/341,337, filed on May 25, 2016.

(51) Int. Cl.
*F01D 21/04* (2006.01)
*F01D 25/24* (2006.01)
*F02K 3/06* (2006.01)

(52) U.S. Cl.
CPC .......... *F01D 21/045* (2013.01); *F01D 25/24* (2013.01); *F02K 3/06* (2013.01); *F05D 2220/323* (2013.01); *F05D 2240/14* (2013.01); *F05D 2300/173* (2013.01); *Y02T 50/672* (2013.01)

(58) Field of Classification Search
CPC ...... F01D 21/045; F01D 25/24; F01D 25/243; F02K 3/06
See application file for complete search history.

(56) References Cited

U.S. PATENT DOCUMENTS

| | | | | |
|---|---|---|---|---|
| 5,259,724 A * | 11/1993 | Liston | .................. | F01D 21/045 415/119 |
| 5,486,086 A * | 1/1996 | Bellia | .................. | F01D 21/045 415/9 |
| 5,823,739 A * | 10/1998 | Van Duyn | ............. | F01D 21/045 415/9 |
| 6,497,550 B2 * | 12/2002 | Booth | .................. | F01D 21/045 415/173.4 |
| 6,497,551 B1 * | 12/2002 | Hand | .................... | F04D 29/526 415/173.1 |
| 6,619,913 B2 * | 9/2003 | Czachor | ................ | F01D 21/045 415/119 |
| 6,638,008 B2 * | 10/2003 | Sathianathan | ........ | F01D 21/045 415/214.1 |
| 6,685,426 B2 * | 2/2004 | Clark | ...................... | F01D 25/04 415/119 |

(Continued)

*Primary Examiner* — Brian P Wolcott
(74) *Attorney, Agent, or Firm* — McCracken & Gillen LLC

(57) ABSTRACT

A soft wall containment system having a casing, a liner system, a containment blanket, and a barrel including multiple features is provided. The soft wall containment system may selectively be installable in a gas turbine engine having a turbine with multiple airfoils. The barrel features may be disposed outboard of the airfoils. The casing barrel may have a first thickness, the casing barrel features may have a second thickness, and the first thickness may be greater than the second thickness. Additionally, the features may be slots that extend through the thickness of the barrel.

20 Claims, 3 Drawing Sheets

(56) References Cited

U.S. PATENT DOCUMENTS

| | | | |
|---|---|---|---|
| 8,297,912 B2* | 10/2012 | Reed | F01D 21/045 |
| | | | 415/220 |
| 8,757,958 B2* | 6/2014 | Lussier | F01D 21/045 |
| | | | 415/9 |
| 2018/0258796 A1* | 9/2018 | Jain | F01D 21/045 |
| 2018/0298780 A1* | 10/2018 | Kray | F01D 21/045 |
| 2018/0298782 A1* | 10/2018 | Waldman | F01D 25/24 |
| 2018/0298915 A1* | 10/2018 | Kray | F04D 29/526 |

* cited by examiner

SOFT WALL CONTAINMENT SYSTEM FOR GAS TURBINE ENGINE

CROSS REFERENCE TO RELATED APPLICATIONS

The present application claims the benefit of U.S. Provisional Application No. 62/341,337, filed May 25, 2016, entitled "Soft Wall Containment System for Gas Turbine Engine", the entire contents of which is incorporated herein by reference.

FIELD OF DISCLOSURE

The present disclosure generally relates to soft wall containment systems for gas turbine engines. More particularly, but not exclusively, the present disclosure relates to configurations and orientations of casing barrel members relative to containment systems of gas turbine engines.

BACKGROUND

Providing engine equipment to contend with potentially disruptive events, such as fan blade off events (FBO), remains an area of interest. Some liner systems employ honeycomb liners which can be used in the event of a blade rub or a blade out condition and, in these embodiments, a low density honeycomb can be used on the backside of an abradable lining that includes an epoxy filled honeycomb. Gas turbine engines can use these liners directly bonded to the inside of the fan case or in the form of a set of cassettes that are bolted into place. Fillers and/or sealants can be used between liner segments and at liner to casing interfaces. Some existing systems have various shortcomings relative to certain applications. Accordingly, there remains a need for further contributions in this area of technology.

SUMMARY

According to one aspect, a containment system for a gas turbine engine, comprising: a turbofan engine casing having a barrel, a liner system mounted inboard of the barrel, and a containment blanket mounted outboard of the barrel, wherein the barrel includes a plurality of features, the features comprising localized reductions in barrel thickness, and wherein each feature has at least one curved edge, and wherein the features are positioned radially outboard of one or more fan blades of the turbofan engine.

According to another aspect, a turbofan engine casing comprising: a barrel, the barrel having a forward portion, a substantially straight portion, and an aft portion, wherein the substantially straight portion of the barrel comprises a plurality of features, the plurality of features comprising localized reductions in barrel thickness in the form of slots that extend through the barrel, the slots defined by at least one curved edge.

According to another aspect, a method for operating a turbofan engine, the method comprising: providing a turbofan engine casing having a barrel, wherein the barrel includes a plurality of features, each feature comprising a localized reduction in barrel thickness, wherein the features are defined by edges that are substantially smooth, running the turbofan engine, wherein a plurality of rotor airfoils are located inboard of the barrel, impacting the barrel of the turbofan engine with one of the plurality of rotor airfoils, and retaining one or more pieces of airfoil debris partially outboard of the barrel.

Other aspects and advantages will become apparent upon consideration of the following detailed description and the attached drawings wherein like numerals designate like structures throughout the specification.

DETAILED DESCRIPTION

Figure 1:
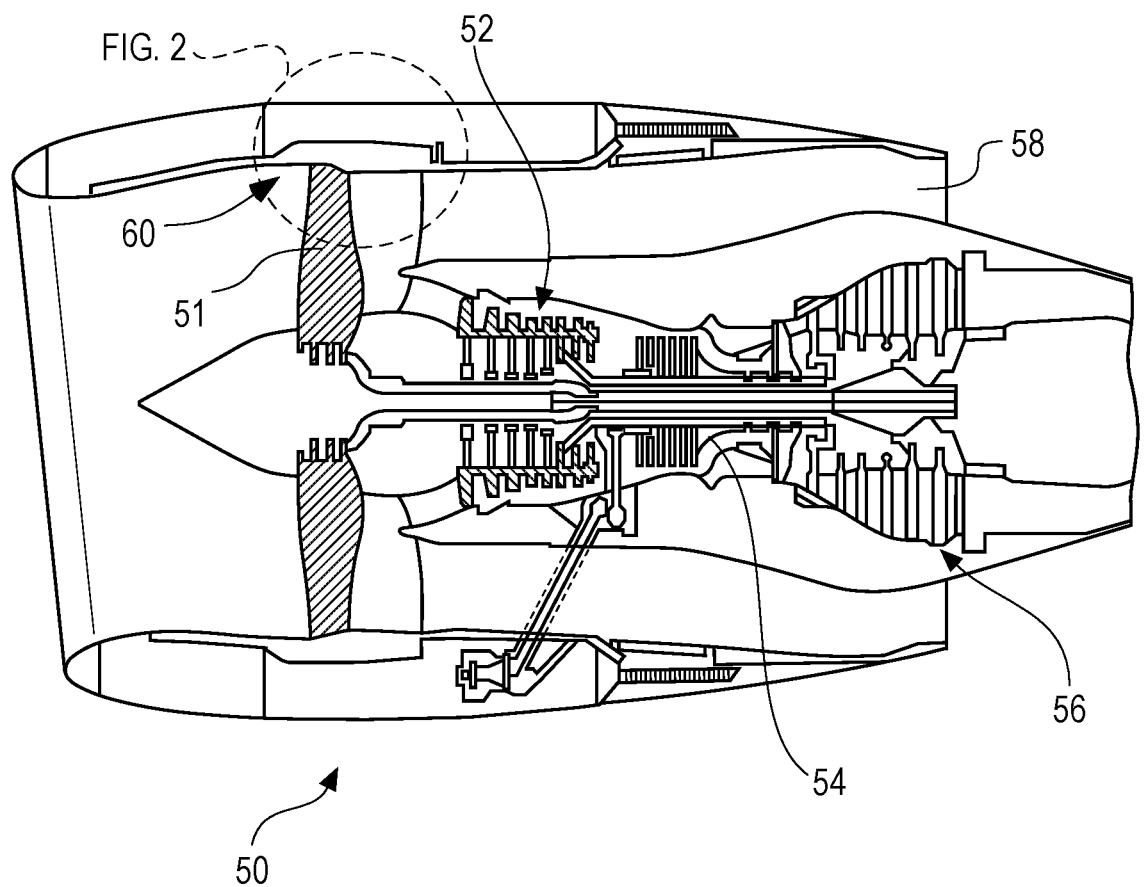
FIG. 1 depicts a side sectional view of a turbofan engine including a soft wall containment system.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended. Any alterations and further modifications in the described embodiments, and any further applications of the principles of the disclosure as described herein are contemplated as would normally occur to one skilled in the art to which the disclosure relates.

Gas turbine fan containment systems have numerous structural requirements to consider, including strength, useful life, fan bade off (FBO) containment (which may entail debris of various size and energy), and durability for post-FBO windmill operation (engine spinning at low rpms). Soft-wall containment systems include a barrel that is wrapped by a containment blanket. The barrel may be metallic, such as aluminum, or composite, and the containment blanket is typically made of dry fabric wrap comprising an aramid fiber such as Kevlar™. The liner system may be comprised of an abradable material such as polymer, an epoxy, and/or a honeycomb material or other material suitable for fan-track liners. The fan blades may be made of a metal, such as titanium, or an alloy of various metals. The barrel may sustain significant damage (including cracks and/or holes) from an FBO event, which is different than other systems that are designed to contain the projectile on the interior of the barrel, known as hard wall systems.

Following an FBO event, the fan casing barrel must have sufficient capability to withstand the structural loads that exist for the remainder of the flight while the rotor is windmilling. Soft wall systems may have significant cost and weight advantages over hard wall containment systems. Those benefits would be significantly reduced if the casing thickness was increased or if additional features were added to withstand post-FBO windmill loads. Certain soft wall systems in service have metallic plates that are mechanically attached to both the forward and rear section of the barrel, to address shortcomings in barrel durability during the FBO event/windmill. Those features increase cost and weight, and may reduce the ability of debris to penetrate the casing barrel.

To minimize secondary damage to the fan rotor and additional high-energy debris, it is desirable for primary debris to fully penetrate the barrel and be retained outboard of the barrel yet captured by the containment blanket. Depending on debris energy and barrel structural capability, it is possible that the debris is retained inboard or partially inboard of the barrel. This may allow for trailing blades in the rotor to contact the airfoil debris and increase damage to the casing and rotor and increase risk for debris. The challenge is even greater for engines that have fusing incorporated into the bearing system, which permit increased rotor displacements and perhaps airfoil contact with the barrel inner surfaces. Even though the barrel may be positioned substantially outboard of the rotor tips, the bearing fusing during FBO permits the rotor to close that gap as it cuts through the liner.

A casing has a barrel forming a containment surface that is configured to be useful during an FBO condition in which a portion of a fan blade may penetrate the liner system and the barrel. It is preferable that the blade penetrate the barrel so that it may be contained by the containment blanket. The liner system and containment blanket are directed away from a flow path through the fan and the liner system is situated between the barrel and the flow path. The barrel forms a structure between the liner system and the containment blanket. The barrel includes features in the form of localized reductions in barrel containment capability outboard of (in the radial direction) and aligned with (in the axial region) the rotor airfoils. The features are localized reductions in barrel thickness and may include through-thickness slots or partial reductions in thickness (pockets). The barrel feature geometry may be configured to decrease crack growth that may occur as a result of an FBO event. These features reduce the barrel containment capability such that debris is more likely to fully penetrate the barrel and minimize interaction with the rotor.

Referring to FIG. 1, a gas turbine engine 50 is illustrated having a fan 51, a compressor section 52, a combustor 54, and a turbine section 56, which together can be used to produce a useful power. Air enters the gas turbine engine 50, is compressed through action of the compressor 52, mixed with a fuel, and combusted in the combustor 54. The turbine 56 is arranged to receive a flow from the combustor 54 and extract useful work from the flow. The gas turbine engine 50 may have a soft wall containment system 60 and can be used to power aircraft such as helicopters, airplanes, unmanned space vehicles, etc. Further, the present disclosure contemplates use in other applications that may not be aircraft related such as industrial applications, power generation, pumping sets, naval propulsion, weapon systems, security systems, perimeter defense/security systems, and the like known to one of ordinary skill in the art.

Figure 2:
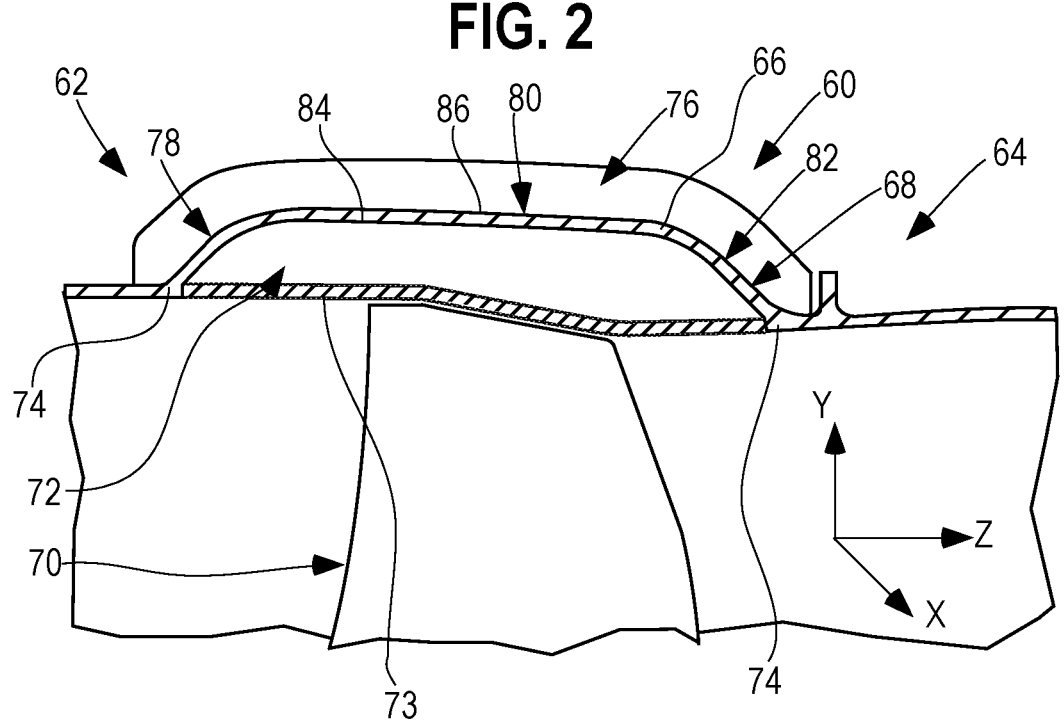
FIG. 2 depicts a detailed view of the soft wall containment system of FIG. 1.

Referring to FIG. 2, one embodiment of a soft wall containment system 60 has a forward end 62 and an aft end 64 and includes a casing 66, a barrel 68, a liner system 72, lugs 74, and a containment blanket 76. The soft wall containment system 60 is located outboard of the rotor airfoils 70 (fan blades). The relative positions of components are described with reference to the axis of rotation of the turbofan engine. The axial direction is denoted by Z, the radial direction is denoted by Y, and the tangential direction is denoted by X. In this example, the barrel 68 has a forward portion 78, a substantially straight portion 80, an aft portion 82, an inboard surface 84, and an outboard surface 86. The inboard surface 84 is closer to the airfoils 70, and the outboard surface 86 is farther away from the airfoils 70 in the radial direction.

The liner system 72 is positioned between the barrel 68 and the fan blades 70. The liner system 72 is comprised of a liner 73 positioned immediately outboard of the airfoils 70, and a volume between the liner 73 and the barrel 68. The volume may be substantially empty, may be segmented in some fashion, and/or it may include filler material. The liner may be abradable and can be constructed in a variety of manners and can be made of one or more materials such as metallic, plastic, composite, honeycomb, etc. For example, the liner can be constructed as a single article or as an article that has portions fastened or bonded to one another in the form of a layered composition. The liner can be cast, stamped, molded, or made in a composite construction. In short, the liner can take on any variety of constructions.

Figure 3:
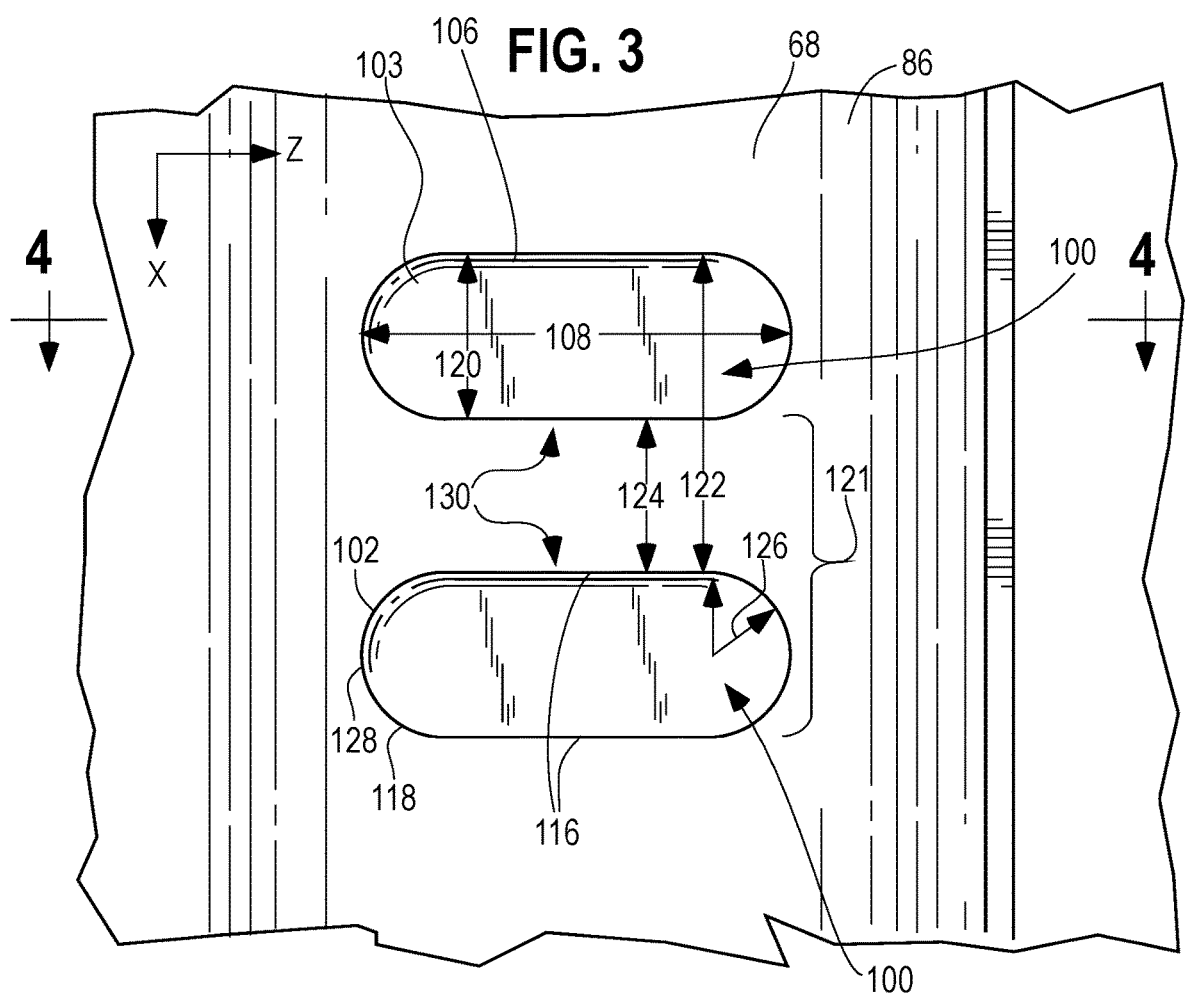
FIG. 3 depicts a top view of an embodiment of a barrel of a soft wall containment system having one or more features.

Referring to FIG. 3, a top view of a barrel 68 an embodiment of a soft wall containment system 60 includes a plurality of features 100 in the form of pockets. The barrel is shown as substantially flat in the tangential or circumferential direction X to more clearly illustrate the shape of the features 100. The features 100 have axial sides 116 and round ends 118 that define an edge 102 that is continuous and smooth. The features 100 have an axial length 108 and a circumferential length 120, and each barrel feature section 121 comprises the circumferential length 120 of a feature 100 and spacing 124 (axial length of an adjacent barrel portion) between the features 100.

Figure 4:
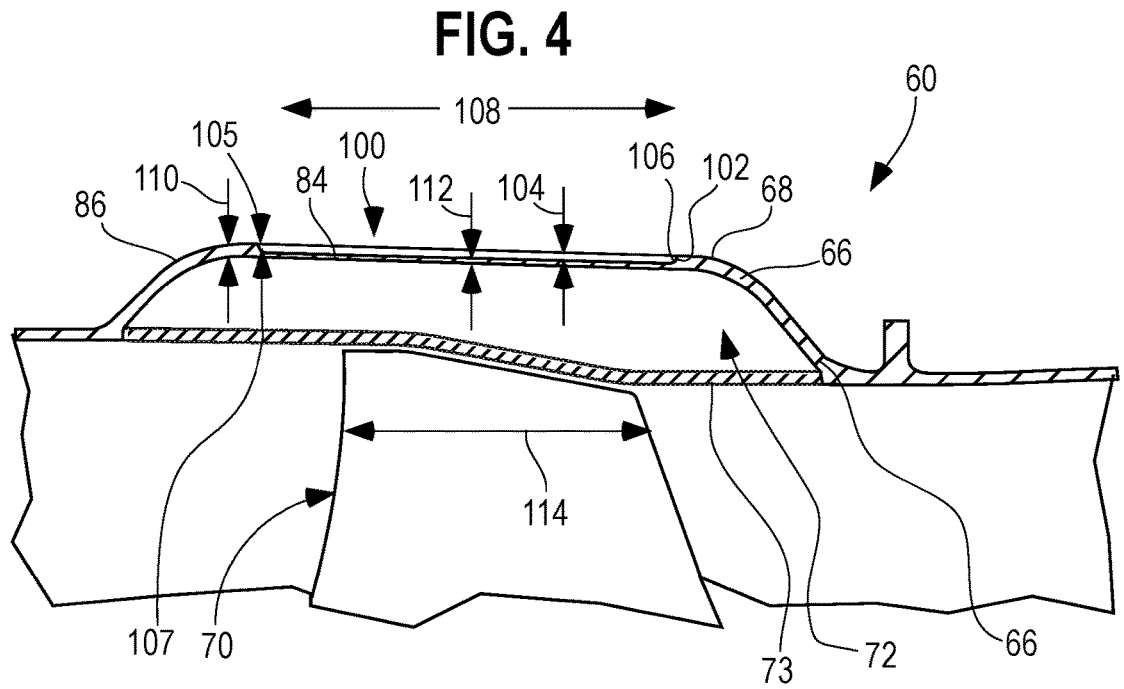
FIG. 4 depicts a side sectional view of the soft wall containment system of FIG. 3 along line 4-4.
Figure 5:
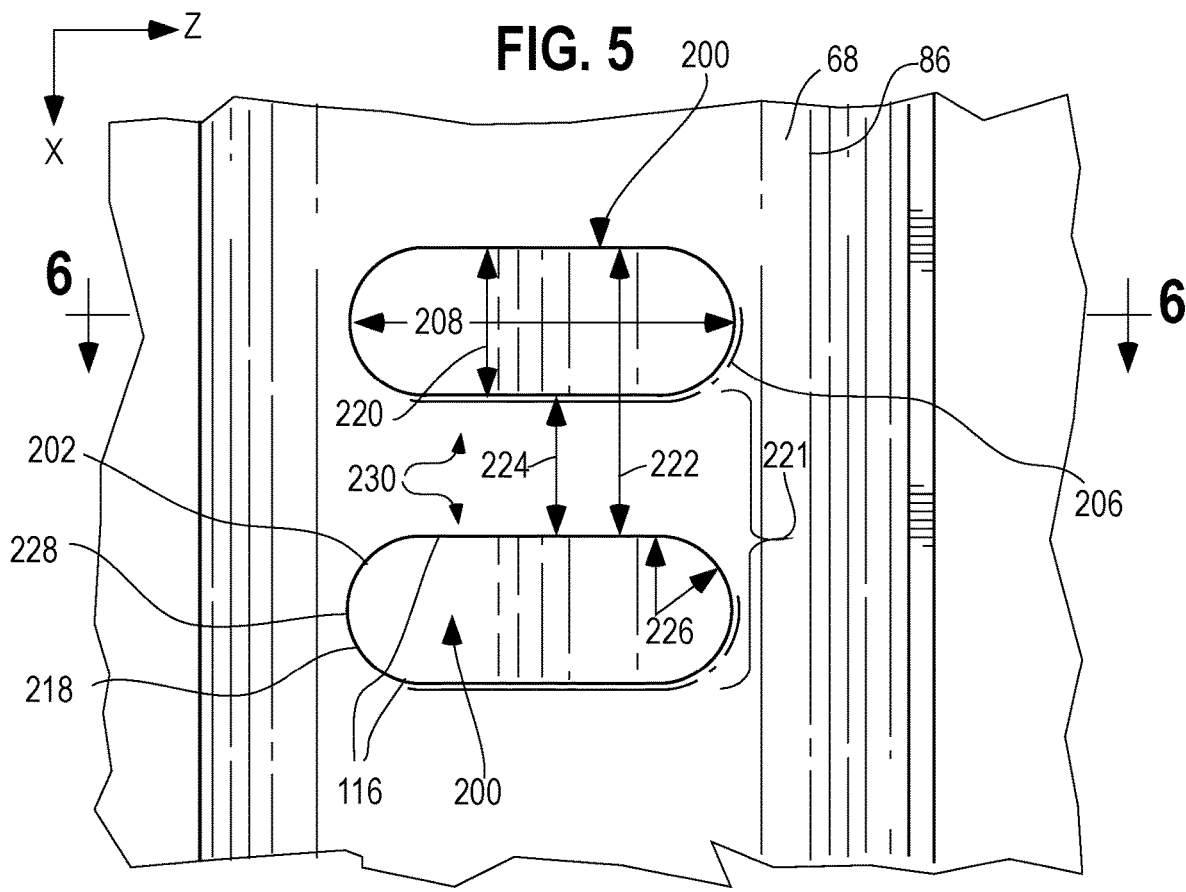
FIG. 5 depicts a top view of the barrel of a further embodiment of a soft wall containment system having one or more features.

The pockets 100 may exist on the outboard surface 86 of the barrel 68, as in FIGS. 3 and 4, or on the inboard surface 84. Round, oblong shaped features 100, 200 are shown in FIGS. 3 and 5. However, the feature geometry may be optimized to minimize weight and to maximize crack growth life. In this example, the features 100 have an edge 102 that is continuous and smooth as not to provide a point of high stress. Optimization of the feature geometry would include changes in thickness (measured in the radial direction) of the feature 112 and/or the barrel 110, as well as changes to the circumferential length 120 and/or shape of the features 100. The features 100, 200 do not need to be oriented in axial direction as shown in FIGS. 3 and 5.

The barrel features 100 may be located beneath the containment blanket 76 such that there is no direct passage that would allow airflow between the fan gas path and the nacelle cavity outboard of the soft wall containment system 60. The barrel features 100 may reduce the containment capability of the barrel 68 such that the debris is more likely to fully penetrate the barrel 68 with a final position that is sufficiently outboard of the gas path to avoid the trailing blades (not shown).

During an FBO event, portions of the barrel may break away as the features are provided to make the barrel easier for debris, such as fan blades, to penetrate. After an FBO event, cracks and/or holes typically form. In maintaining the structural integrity of the barrel, it is important to prevent cracks from growing such that the casing maintains structural integrity. For example, the features may be configured to stop crack propagation in a circumferential direction and to direct cracks toward areas of low stress.

Rather than having edges that meet at an angle, the feature edges 102 are designed to transition using smooth curves having a radius to minimize stress concentrations that would become sources of crack propagation. The features 100 shown in the illustrated embodiment are provided with round ends 118 having an edge radius 126 that results in a smooth curve 128 joining each axial side 116 of the feature 100. The radius 126 of the feature edge 102 may be less than the circumferential length 120 of the feature 100. Preferably, a ratio of the edge radius 126 to the circumferential length 120 is between about 1:10 and about 1:2.

Typically, a fan rotor may have between sixteen and twenty-four airfoils 70. An example embodiment of a soft wall containment system 60 may have a barrel 68 with a range of between about eight features to about thirty features 100. The circumferential length 122 of the barrel feature sections 121 is determined the circumferential length of the barrel divided by the number of features. These barrel feature sections effectively segment the substantially straight portion of the barrel. While some segments may be penetrated after an FBO event, other segments will remain intact and provide structural integrity to the casing.

The circumferential spacing 124 of features 100 may be optimized to prevent crack growth while at the same time providing structural stability after an FBO event. A ratio of circumferential length 120 (of the features 100) to circumferential spacing 124 may range from about 5:1 to about 1:5.

In the illustrated embodiment, each feature 100 has an area 130 that is equal to the area 130 of an adjacent feature 100. In other embodiments, adjacent features have unequal areas. The relative area covered by the plurality of features (compared to the entire area of the substantially straight portion 80 of the barrel 68) is preferably between about 10% and about 90%.

Referring to FIG. 4, a side view of the soft wall containment system 60 includes a barrel 68 that may be formed integrally with the casing 66 or may be attached using bolts or lugs. The barrel 68 includes one or more features 100 in the form of pockets that extend from the outboard surface 86 of the barrel 68 toward the inboard surface 84 of the barrel 68. The pocket features 100 have walls 103 (FIG. 3) that gradually curve to a depth and gradually slope downward from the edge 102 of the feature 100 to a maximum depth 104. The edge 102 forms a smooth curve 106 as the barrel 68 surface is blended into the feature 100 in a rounded fillet that is substantially smooth and lacks any sharp corners. The radius 105 of the feature edge 102 is preferably about half the maximum thickness of the barrel 110. Preferably, a ratio of radius 105 of the edge to the maximum thickness of the barrel 110 is between about 1:5 and about 5:1.

The minimum barrel thickness 112 ($t_F$) exists at the maximum depth 104 of the feature 100. When compared to the maximum thickness of the substantially straight portion of the barrel 110 ($t_B$) between the features, the barrel 68 and features 100 define a feature thickness ratio $R=t_F/t_B$. Preferably the feature thickness ratio is less than about 0.90 and more preferably ranges from about 0.10 to about 0.90.

Each feature is preferably machined into the aluminum that forms the barrel. The features may be machined into the aluminum before or after the barrel is assembled.

Similarly to the feature edge 102 having a smooth curve, the feature may include a second curved surface as the walls of the pocket slope downward toward a maximum feature depth. The interior surface of the feature is substantially smooth as the radius 107 of the feature walls 103 (FIG. 3) is preferably greater than half of the maximum thickness of the barrel 110.

Each rotor airfoil 70 has an axial length 114 near the blade tip. Pocket features 100 have an axial length 108 that is greater than 50% of the axial length 114 of the rotor airfoils. In some embodiments, the features may have an axial length 108 that is greater than the axial length 114 of the rotor airfoils. Additionally in some embodiments, the features 100 may be outboard of and centered axially over the airfoil rotors 70 and in other embodiments, the features 100 are positioned outboard of and slightly aftward (or slightly forward) of the centerline of the airfoil rotors 70.

With reference to FIG. 5, a top view of a barrel 68 of a further embodiment of a soft wall containment system 60 shows a plurality of features 200 in the form of through thickness slots. The barrel is shown as substantially flat in the tangential or circumferential direction X to more clearly illustrate the shape of the features 200. The smooth curve on the edges 206 of the features 200 provide a surface that is substantially smooth and free from corners. In the case of through thickness slots 200, the thickness of the barrel 68 at the maximum depth of the feature is zero. Therefore, the feature thickness ratio $R=t_F/t_B$ would also be zero.

The slot features 200 have an axial length 208 and a circumferential length 220, and axial sides 216 that are joined by round ends 218, each having an edge radius 226. The radius 226 of the feature edge 202 may be less than the circumferential length 220 of the feature 200. Preferably, a ratio of the edge radius 226 to the circumferential length 220 is between about 1:10 and about 1:2.

Each slot feature 200 defines an area 230 that is substantially equal to each adjacent slot 200. The relative area covered by the plurality of features 200 (compared to the entire area of the substantially straight portion 80 of the barrel 68) is preferably between about 15% and about 85%. A ratio of circumferential length 220 (of the features 200) to circumferential spacing 224 may range from about 3:1 to about 1:20.

Figure 6:
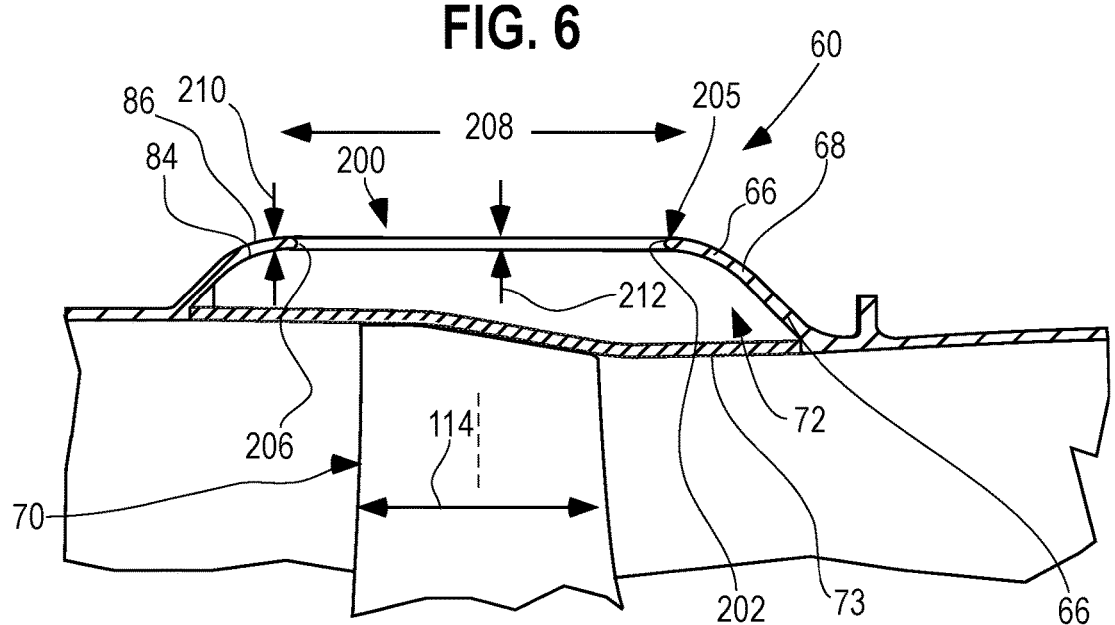
FIG. 6 depicts a side sectional view of the soft wall containment system of FIG. 5 along line 6-6.

Referring to FIG. 6, a side sectional view of a soft wall containment system 60 shows a barrel 68 having one or more features 200 in the form of slots that extend through the thickness 210 of the barrel 68. The slot features 200 have an axial length 208 that is greater than 50% of the axial length 114 of rotor airfoil blades 70. In some embodiments, the slot features have an axial length 208 that is greater than the axial length 114 of the rotor airfoils. The slot features 200 formed in the barrel 68 have a round edge 202 that forms a smooth curve 206 from the outboard surface 86 to the inboard surface 84 of the barrel 68. The edge 202 lacks corners that would provide points of high stress. The radius 205 of the feature edge 202 is preferably about half the maximum thickness of the barrel 210. Alternatively, the features 200 could be defined by an edge 202 on the outboard surface 86 of the barrel 68 could have a substantially curved edge separate from a substantially curved edge on the inboard surface joined by a flat (in the radial direction) wall lacking corners. Additionally, the features 200 could be defined by an edge having a chamfer or other edge geometry as to avoid a 90 degree angle.

The disclosure differs from conventional barrel designs in that it intentionally reduces the containment capability of the barrel to aid in the airfoil penetration of the barrel during an FBO event to encourage posting. This permits the airfoil to be ejected outboard of the gas path and reduces likelihood of secondary damage and debris. The reduced average thickness in the barrel may reduce crack propagation capability. Further, the feature geometry may be optimized (tuning feature thickness and shape) to influence crack growth direction and crack propagation life. Satisfying crack propagation life in this manner avoids the high cost and weight penalty for introducing retention plates or similar reinforcement of the barrel.

A barrel having pocket features 100 is generally preferred for containment blanket moisture protection whereas a barrel comprising slot features 200 may have the potential for leakage. However, slot features 200 may prevent cracks from spreading circumferentially to a greater extent than pocket features 100 as there is an absence of barrel 68 material through which a crack could pass.

Through thickness slot features 200 may reduce the structural integrity of a barrel 68 to a greater extent than pocket features 100 (comparing two barrels having the same circumference and thickness, one having through thickness slots 200, and the other having pocket features 100). As such, the spacing 224 of slot features 200 along the circumference of a barrel 68 may be greater than the spacing 124 of pocket features 100. For similar reasons, the relative area of pocket features (as compared to the total area of the substantially straight portion of the barrel) may generally be higher than the relative area of slot features.

The features shown are symmetrical and have at least one round edge. They may be oriented in an axial direction and divide the barrel along a circumferential direction (as shown) or multiple features may be spaced equidistant from one another in the axial direction as well, such as in a hexagonal arrangement. Alternate embodiments include features that have other shapes with one generally round edge (such as circles or ovals) which lack corners and may be symmetrically or asymmetrically shaped. The shapes may be consistently shaped and sized or they may vary as they are positioned along the substantially straight portion of the barrel.

Each feature is preferably machined into the aluminum that forms the barrel. The features may be machined into the aluminum before or after the barrel is assembled.

The embodiment(s) detailed above may be combined, in full or in part, with any alternative embodiment(s) described.

INDUSTRIAL APPLICABILITY

Important advantages of a soft wall containment system comprising a casing having a barrel that includes one or more weight reduction features includes improved posting of an airfoil blade during a fan-blade-off event and a reduction in the weight of the barrel.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. Various embodiments of this disclosure are described herein, including the best mode known to the inventors for carrying out the disclosure. It should be understood that the illustrated embodiments are exemplary only, and should not be taken as limiting the scope of the disclosure.

We claim:

1. A containment system for a turbofan engine, comprising:
    a turbofan engine casing having a barrel;
    a liner system mounted inboard of the barrel; and
    a containment blanket mounted outboard of the barrel;
    wherein the barrel includes a plurality of features, each of the plurality of features comprising a localized reduction in barrel thickness, wherein each of the plurality of features has at least one curved edge, and wherein each of the plurality of the features is positioned radially outboard of and centered axially over one or more fan blades of the turbofan engine.

2. The system of claim 1, wherein the plurality of features are defined by one or more shapes that are substantially symmetrical, each of the plurality of features having a wall that curves in a radial direction toward an area of minimum barrel thickness.

3. The system of claim 2, wherein the barrel has a maximum barrel thickness, and each of the plurality of features defines the minimum barrel thickness, wherein a relative feature thickness is defined by the minimum barrel thickness divided by the maximum barrel thickness, and wherein the relative feature thickness is less than 0.90.

4. The system of claim 3, wherein each of the plurality of features is configured to disrupt the growth of cracks along the barrel, and the plurality of features are oriented in an axial direction in an evenly spaced arrangement along a circumference of a substantially straight portion of the barrel.

5. The system of claim 4, wherein the plurality of features are disposed on an outboard surface of the barrel.

6. The system of claim 5, wherein the one or more shapes lack corners.

7. The system of claim 6, wherein each of the plurality of features has an axial length that is greater than 50% of an axial length of the one or more fan blades.

8. The system of claim 7, wherein the barrel is constructed of an aluminum alloy and the plurality of features are machined into the barrel.

9. The system of claim 8, wherein the plurality of features are through thickness slots and the relative feature thickness is zero.

10. A turbofan engine casing comprising:
    a barrel, the barrel having a forward portion, a substantially straight portion, and an aft portion;
    wherein the substantially straight portion of the barrel comprises a plurality of features, the plurality of features comprising localized reductions in barrel thickness in the form of slots that extend through the barrel, wherein the slots are disposed radially outboard of fan blades of the turbofan engine and are defined by at least one curved edge, and wherein the slots have an axial length that is greater than an axial length of the fan blades.

11. The turbofan engine casing of claim 10, wherein the plurality of features have edges that lack corners, the edges defined by substantially smooth surfaces extending from an outboard surface of the barrel to an inboard surface of the barrel.

12. The turbofan engine casing of claim 11, wherein the plurality of features are configured to disrupt the growth of cracks along the barrel, and the plurality of features are oriented in an axial direction and form evenly spaced segments along a circumference of the substantially straight portion of the barrel.

13. The turbofan engine casing of claim 12, wherein the plurality of features define between three and thirty evenly spaced segments along the circumference of the substantially straight portion of the barrel.

14. The turbofan engine casing of claim 13, wherein the plurality of features cover a total feature surface area and the substantially straight portion of the barrel defines a total barrel surface area, wherein a relative feature surface area is defined by the total feature surface area divided by the total barrel surface area, and wherein the relative feature surface area is between 0.10 and 0.90.

15. The turbofan engine casing of claim 14, wherein the plurality of features have one or more shapes that are substantially symmetrical.

16. The turbofan engine casing of claim 15, wherein the barrel is constructed of an aluminum alloy and the plurality of features are machined into the barrel.

17. A method for operating a turbofan engine, the method comprising:
   providing a turbofan engine casing having a barrel and a liner system inboard of the barrel, wherein the barrel includes a plurality of features, each of the plurality of features comprising a localized reduction in barrel thickness, wherein each of the plurality of features is defined by edges that are substantially smooth, wherein the plurality of features are disposed in an evenly spaced arrangement along a circumference of a substantially straight portion of the barrel, and wherein the plurality of features are centered axially over one or more fan blades of the turbofan engine;
   running the turbofan engine, wherein a plurality of rotor airfoils are located inboard of the barrel;
   impacting the barrel of the turbofan engine with one of the plurality of rotor airfoils; and
   retaining one or more pieces of airfoil debris partially outboard of the barrel.

18. The method of claim 17, further comprising inhibiting growth of cracks in the barrel, wherein the plurality of features extend in an axial direction and are positioned radially outboard of one or more fan blades of the turbofan engine.

19. The method of claim 17, wherein the impacting of the barrel includes the one or more pieces of airfoil debris penetrating a portion of the barrel.

20. The method of claim 19, wherein the impacting of the barrel includes penetrating at least one of the plurality of features, wherein the plurality of features have at least one edge and are sacrificial portions of the barrel in the shape of pockets or through thickness slots.

* * * * *